(12) United States Patent
Ng et al.

(10) Patent No.: US 11,859,563 B2
(45) Date of Patent: Jan. 2, 2024

(54) AIR SYSTEM OF MULTI-ENGINE AIRCRAFT

(71) Applicant: PRATT & WHITNEY CANADA CORP., Longueuil (CA)

(72) Inventors: Kevin Ng, Ancaster (CA); Philippe Beauchesne-Martel, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/657,521

(22) Filed: Oct. 18, 2019

(65) Prior Publication Data

US 2020/0378314 A1 Dec. 3, 2020

Related U.S. Application Data

(60) Provisional application No. 62/855,087, filed on May 31, 2019.

(51) Int. Cl.
| | |
|---|---|
| *F02C 9/18* | (2006.01) |
| *B64D 13/02* | (2006.01) |
| *B64D 27/10* | (2006.01) |
| *B64D 41/00* | (2006.01) |

(52) U.S. Cl.
CPC ............... *F02C 9/18* (2013.01); *B64D 13/02* (2013.01); *B64D 27/10* (2013.01); *B64D 41/00* (2013.01); *F05D 2220/323* (2013.01)

(58) Field of Classification Search
CPC .... F02C 6/00; F02C 6/08; F02C 7/268; F02C 7/26; F02C 9/18
See application file for complete search history.

(56) References Cited

U.S. PATENT DOCUMENTS

| | | | |
|---|---|---|---|
| 1,010,073 | A | 11/1911 | Ream |
| 2,786,331 | A | 3/1957 | Williams |
| 3,325,994 | A | 6/1967 | Zaba et al. |
| 3,851,464 | A | 12/1974 | Davis et al. |
| 3,869,862 | A | 3/1975 | Dickey |
| 4,083,181 | A | 4/1978 | Adamson |

(Continued)

FOREIGN PATENT DOCUMENTS

| | | |
|---|---|---|
| CA | 2965946 | 3/2018 |
| CN | 207935063 U | 10/2018 |

(Continued)

OTHER PUBLICATIONS

European Search Report issued in Application No. 20165886.1 dated Aug. 17, 2020.

(Continued)

*Primary Examiner* — Thuyhang N Nguyen
(74) *Attorney, Agent, or Firm* — NORTON ROSE FULBRIGHT CANADA LLP

(57) ABSTRACT

A method of operating an engine of an aircraft, the engine having a bleed air system. The method includes in flight, directing pressurized air from a source of pressurized air external to the engine to the bleed air system of the engine. An aircraft, comprising a first engine having a bleed air system, a second engine having a bleed air system, and a source of pressurized air that is external to the first and/or the second engine, the source of pressurized air being selectively fluidly connectable to the bleed air system of the first and/or the second engine, is also disclosed.

18 Claims, 7 Drawing Sheets

(56) References Cited

U.S. PATENT DOCUMENTS

| | | | |
|---|---|---|---|
| 4,213,738 A | 7/1980 | Williams | |
| 4,217,755 A | 8/1980 | Williams | |
| 4,251,985 A | 2/1981 | Sullivan | |
| 4,625,510 A | 12/1986 | Evans | |
| 4,627,234 A | 12/1986 | Schuh | |
| 4,741,164 A | 5/1988 | Slaughter | |
| 4,900,231 A | 2/1990 | Kennedy | |
| 5,018,601 A | 5/1991 | Waddington et al. | |
| 5,161,364 A | 11/1992 | Bruun et al. | |
| 5,429,208 A | 7/1995 | Largillier et al. | |
| 5,553,449 A | 9/1996 | Rodgers et al. | |
| 5,553,461 A | 9/1996 | Hitzigrath et al. | |
| 6,282,882 B1 | 9/2001 | Dudd, Jr. et al. | |
| 6,344,949 B1 | 2/2002 | Albrecht et al. | |
| 6,751,979 B2 | 6/2004 | Leathers | |
| 6,792,746 B2 | 9/2004 | Saito et al. | |
| 6,845,606 B2 | 1/2005 | Franchet et al. | |
| 6,868,664 B2 | 3/2005 | Albero et al. | |
| 6,885,917 B2 | 4/2005 | Osder et al. | |
| 6,921,244 B2 | 7/2005 | Johnson | |
| 7,104,282 B2 | 9/2006 | Hooker | |
| 7,121,078 B2 | 10/2006 | Turco et al. | |
| 7,328,098 B1 | 2/2008 | VanderLeest et al. | |
| 7,464,533 B2 | 12/2008 | Wollenweber | |
| 7,584,618 B2 | 9/2009 | Amiot et al. | |
| 7,584,619 B2 | 9/2009 | Granitz et al. | |
| 7,797,962 B2 | 9/2010 | Kresser et al. | |
| 7,843,354 B2 | 11/2010 | Holt et al. | |
| 7,861,536 B2 | 1/2011 | Alecu et al. | |
| 7,959,109 B2 | 6/2011 | DaSilva et al. | |
| 7,980,052 B1 | 7/2011 | Paulino | |
| 8,245,493 B2 * | 8/2012 | Minto | F02C 7/22 60/39.52 |
| 8,453,462 B2 | 6/2013 | Wichmann et al. | |
| 8,511,058 B2 | 8/2013 | Agrawal et al. | |
| 8,529,189 B2 | 9/2013 | Brown et al. | |
| 8,778,091 B1 | 7/2014 | Lockyer | |
| 8,967,528 B2 | 3/2015 | Mackin et al. | |
| 9,068,463 B2 | 6/2015 | Pandey et al. | |
| 9,068,465 B2 | 6/2015 | Pandey et al. | |
| 9,205,927 B2 | 12/2015 | Shepard et al. | |
| 9,222,578 B2 | 12/2015 | Long | |
| 9,279,341 B2 | 3/2016 | Durocher et al. | |
| 9,297,304 B2 | 3/2016 | Nordstrom | |
| 9,359,949 B2 | 6/2016 | Olivarez et al. | |
| 9,611,947 B2 | 4/2017 | Hallisey et al. | |
| 9,624,831 B2 | 4/2017 | Brousseau et al. | |
| 9,631,512 B2 | 4/2017 | Lockyer | |
| 9,810,158 B2 | 11/2017 | Foutch et al. | |
| 9,902,500 B2 | 2/2018 | Stadler et al. | |
| 9,903,221 B2 | 2/2018 | Jacobs et al. | |
| 9,995,222 B2 | 6/2018 | Schwarz et al. | |
| 10,054,051 B2 | 8/2018 | Foutch et al. | |
| 10,060,358 B2 | 8/2018 | Tiwari et al. | |
| 10,100,744 B2 | 10/2018 | Mackin et al. | |
| 10,107,206 B2 | 10/2018 | Forcier et al. | |
| 10,125,690 B2 * | 11/2018 | Zaccaria | F02C 7/268 |
| 10,125,691 B2 | 11/2018 | Feulner et al. | |
| 10,138,812 B2 | 11/2018 | Heaton et al. | |
| 10,155,592 B2 | 12/2018 | McAuliffe et al. | |
| 10,293,945 B2 | 5/2019 | Hoffjann et al. | |
| 10,415,468 B2 | 9/2019 | Ackermann et al. | |
| 10,451,491 B2 | 10/2019 | Chapman | |
| 10,458,267 B2 | 10/2019 | Gibson et al. | |
| 10,458,278 B2 | 10/2019 | Avis et al. | |
| 10,461,348 B2 | 10/2019 | Im et al. | |
| 10,487,734 B2 | 11/2019 | Munsell | |
| 10,487,751 B2 | 11/2019 | DiBenedetto | |
| 10,508,601 B2 | 12/2019 | Sheridan et al. | |
| 10,563,590 B2 | 2/2020 | Coldwate et al. | |
| 10,569,887 B2 | 2/2020 | Valiquette et al. | |
| 11,047,257 B2 * | 6/2021 | Chowdhury | F02C 3/04 |
| 2002/0189230 A1 | 12/2002 | Franchet et al. | |
| 2003/0131585 A1 | 7/2003 | Saito et al. | |
| 2004/0168427 A1 | 9/2004 | Truco et al. | |
| 2006/0123796 A1 | 6/2006 | Aycock et al. | |
| 2007/0289285 A1 | 12/2007 | Jorn | |
| 2010/0058731 A1 | 3/2010 | Haehner et al. | |
| 2010/0326085 A1 * | 12/2010 | Veilleux | F01D 1/06 60/778 |
| 2011/0271687 A1 | 11/2011 | Nordstrom et al. | |
| 2012/0023962 A1 | 2/2012 | Wichmann et al. | |
| 2012/0139370 A1 | 6/2012 | Pal | |
| 2012/0240588 A1 | 9/2012 | Patel et al. | |
| 2012/0304663 A1 | 12/2012 | Weber et al. | |
| 2013/0040545 A1 | 2/2013 | Finney | |
| 2013/0174574 A1 | 7/2013 | Heaton | |
| 2013/0192251 A1 | 8/2013 | Munsell | |
| 2014/0366547 A1 * | 12/2014 | Kraft | F02C 7/10 60/772 |
| 2014/0373551 A1 * | 12/2014 | Kraft | F02C 9/16 60/772 |
| 2015/0252731 A1 | 9/2015 | Riordan | |
| 2016/0003144 A1 | 1/2016 | Kupratis | |
| 2016/0123237 A1 | 5/2016 | Spagnoletti | |
| 2016/0237917 A1 * | 8/2016 | Marconi | F01D 15/12 |
| 2016/0273393 A1 * | 9/2016 | Ekanayake | F02C 6/08 |
| 2016/0332737 A1 | 11/2016 | Sabnis | |
| 2016/0369695 A1 | 12/2016 | Perlak et al. | |
| 2017/0016399 A1 * | 1/2017 | Bedrine | B64D 27/10 |
| 2017/0106985 A1 | 4/2017 | Stieger et al. | |
| 2017/0191419 A1 | 7/2017 | Bayraktar et al. | |
| 2017/0210478 A1 | 7/2017 | Mackin | |
| 2017/0268431 A1 | 9/2017 | Schwarz | |
| 2017/0298836 A1 | 10/2017 | Tiwari | |
| 2017/0335772 A1 | 11/2017 | Coldwate et al. | |
| 2017/0369180 A1 | 12/2017 | Jones | |
| 2018/0010520 A1 | 1/2018 | Iwasaki et al. | |
| 2018/0022463 A1 * | 1/2018 | Teicholz | F01D 21/003 60/778 |
| 2018/0045115 A1 | 2/2018 | Glann et al. | |
| 2018/0057170 A1 * | 3/2018 | Sautron | F02C 9/18 |
| 2018/0058336 A1 | 3/2018 | Munevar | |
| 2018/0073428 A1 | 3/2018 | Morgan et al. | |
| 2018/0080378 A1 | 3/2018 | Alecu | |
| 2018/0080380 A1 | 3/2018 | Simonetti | |
| 2018/0093778 A1 | 4/2018 | Spack et al. | |
| 2018/0128176 A1 | 5/2018 | Staubach et al. | |
| 2018/0135525 A1 | 5/2018 | Morgan et al. | |
| 2018/0201386 A1 | 7/2018 | Strauss | |
| 2018/0334918 A1 | 11/2018 | Ortiz et al. | |
| 2019/0010876 A1 | 1/2019 | Deroy et al. | |
| 2019/0032574 A1 | 1/2019 | Maguire et al. | |
| 2019/0063324 A1 | 2/2019 | Gould et al. | |
| 2019/0232497 A1 | 8/2019 | Tall et al. | |
| 2019/0283887 A1 | 9/2019 | Ernst et al. | |
| 2019/0309683 A1 | 10/2019 | Mackin et al. | |
| 2019/0323426 A1 * | 10/2019 | Mackin | B64D 27/10 |
| 2019/0368417 A1 | 12/2019 | Terwilliger | |
| 2019/0383167 A1 | 12/2019 | Schwarz et al. | |
| 2019/0383220 A1 | 12/2019 | Mackin | |
| 2020/0032702 A1 | 1/2020 | Kupratis | |
| 2020/0095931 A1 | 3/2020 | Vinski | |
| 2020/0248627 A1 | 8/2020 | Amari | |
| 2022/0228532 A1 | 7/2022 | Takaki | |

FOREIGN PATENT DOCUMENTS

| | | |
|---|---|---|
| EP | 1923575 | 5/2008 |
| EP | 2267288 | 12/2010 |
| EP | 2407652 A1 | 1/2012 |
| EP | 3095703 | 11/2016 |
| EP | 3282094 | 2/2018 |
| EP | 3318727 | 5/2018 |
| EP | 3323727 | 5/2018 |
| WO | 2012007341 A1 | 1/2012 |
| WO | 2013154630 | 10/2013 |
| WO | 2014033220 A1 | 3/2014 |

OTHER PUBLICATIONS

European Search Report dated Feb. 11, 2021 for Application No. 20166019.8.

(56) References Cited

OTHER PUBLICATIONS

The PW100 Engine: 20 Years of Gas Turbine Technology Evolution, E. Hosking, D. P. Kenny, R. I. McCormick S. H. Moustapha, P. Sampath, A. A. Smailys, presented at the RTO AVT Symposium on "Design Principles and Methods for Aircraft Gas Turbine Engines", held in Toulouse, France, May 11-15, 1998, and published in RTO MP-8—relevant section : p. 4-7, col. 2, lines 5-12.

John H. Perepezko, The Hotter the Engine, the Better, Nov. 20, 2009, AAAS, Science, www.sciencemag.org vol. 326, pp. 1068-1069.

S. Kuz'michev, V. N. Rybalko, A. Y. Tkachenko and I. N. Krupenich, Optimization of Working Process Parameters of Gas Turbine Engines Line on the Basis of Unified Engine Core, ARPN Journal of Engineering and Applied Sciences, vol. 9, No. 10, Oct. 2014, ISSN 1819-6608, p. 1877.

European Search Report dated Jun. 10, 2021 for Application No. 20201413.0.

* cited by examiner

AIR SYSTEM OF MULTI-ENGINE AIRCRAFT

CROSS-REFERENCE

This application claims the benefit of priority to U.S. Application No. 62/855,087, entitled "AIR SYSTEM OF MULTI-ENGINE AIRCRAFT", filed May 31, 2019, and incorporated by reference herein in its entirety.

TECHNICAL FIELD

The application relates generally to air systems of aircraft.

BACKGROUND

Aircraft are often provided with two engines, typically gas turbine engines. In the case of helicopters, typically two turboshaft engines are connected to a main rotor via a common reduction gearbox, and each of the engines may be sized to such that the power of each engine is greater than what is required for cruising.

Bleed air produced by a gas turbine engine of a multi-engine aircraft is compressed air from a compressor stage and is used for various functions of that engine (such as cooling of turbines and to help seal bearing cavities, for example). Bleed air may also be used for aircraft functions (such as engine starting, cabin pressure, air systems, pressurizing liquid tanks, etc.). Engine bleed air can be derived from the high pressure or the low pressure compressor stage, depending on the air pressure requirements and the engine operating condition.

SUMMARY

In an aspect, there is provided a method of operating an engine of an aircraft, the engine having a bleed air system, the method comprising in flight, directing pressurized air from a source of pressurized air external to the engine to the bleed air system of the engine.

In some embodiments, the engine is a first engine, the aircraft includes a second engine, and directing the pressurized air includes directing the pressurized air to the first engine from a bleed air system of the second engine.

In some embodiments, the method further includes directing pressurized air to the bleed air system of the first engine when the first engine is operating in a standby mode.

In some embodiments, the source of pressurized air is a first source of pressurized air, the aircraft includes a second source of pressurized air that is external to both the first engine and the second engine, and the method further comprises directing pressurized air from the second source of pressurized air to the first engine.

In some embodiments, the method includes directing pressurized air from the second source of pressurized air to the second engine.

In some embodiments, the method includes directing pressurized air from the second source of pressurized air to both the first engine and the second engine.

In some embodiments, the source of pressurized air external to the engine is one of: an auxiliary power unit (APU) of the aircraft, and an air compressor of the aircraft.

In some embodiments, the engine is a first engine, the aircraft includes a second engine, and the method further includes directing pressurized air from the source of pressurized air to the second engine.

In some embodiments, the method includes directing pressurized air from the source of pressurized air to both the first engine and the second engine.

In another aspect, there is provided a method of operating a bleed air system of a first gas turbine engine of a multi-engine aircraft, comprising: operating the first gas turbine engine of the aircraft during flight in a standby mode; operating a second gas turbine engine of the aircraft during flight in an active mode; and directing pressurized air from a bleed air system of the second gas turbine engine to a bleed air system of the first gas turbine engine.

In some embodiments, the method includes operating a source of pressurized air of the aircraft external to both the first gas turbine engine and the second gas turbine engine, and directing pressurized air from the source of pressurized air to at least one of the first gas turbine engine and the second gas turbine engine.

In some embodiments, the method includes directing pressurized air from the source of pressurized air to at least another one of the first gas turbine engine and the second gas turbine engine simultaneously with the directing pressurized air from the source of pressurized air to the at least one of the first gas turbine engine and the second gas turbine engine.

In some embodiments, the second source of pressurized air is one of: an auxiliary power unit of the aircraft, and an air compressor of the aircraft.

In another aspect, there is provided an aircraft, comprising: a first engine having a bleed air system; a second engine having a bleed air system; and a source of pressurized air that is external to the first and/or the second engine, the source of pressurized air being selectively fluidly connectable to the bleed air system of the first and/or the second engine.

In some embodiments, the aircraft further comprises at least one control valve disposed fluidly between the source of pressurized air and the bleed air system of the at least one of the first and the second engine, the at least one control valve being operable to selectively fluidly connect the source of pressurized air to the bleed air system of the at least one of the first and the second engine.

In some embodiments, the at least one control valve fluidly connects: i) the bleed air system of the first engine to the bleed air system of the second engine when the second engine is operating in a standby mode while the first engine is operating in an active mode, and ii) the bleed air system of the second engine to the bleed air system of the first engine when the first engine is operating in a standby mode while the second engine is operating in an active mode.

In some embodiments, each of the first and the second engine is operable in any one of a standby mode and an active mode, and the source of pressurized air is: a) the bleed air system of the second engine when the first engine is operating in the standby mode, b) the bleed air system of the first engine when the second engine is operating in the standby mode.

In some embodiments, the aircraft further comprises a second source of pressurized air that is external to both the first and the second engine, the second source of pressurized air being selectively fluidly connectable simultaneously to both first and the second engine.

In some embodiments, the second source of pressurized air is an auxiliary power unit of the aircraft.

In some embodiments, the second source of pressurized air is an air compressor of the aircraft.

In another aspect, there is provided a method of operating a fluid system of a given type of a first gas turbine engine of a multi-engine aircraft, comprising: operating the first gas turbine engine of the aircraft during flight in a standby mode; operating a second gas turbine engine of the aircraft during flight in an active mode; and directing fluid from a fluid system of the given type of the second gas turbine engine to the fluid system of the first gas turbine engine.

In another aspect, there is provided an aircraft, comprising: a first engine having a fluid system of a given type and a second engine having a fluid system of the given type that is fluidly connectable to the fluid system of the first engine at least when the first engine is operated in a standby mode with the second engine operating in an active mode.

DESCRIPTION OF THE DRAWINGS

Reference is now made to the accompanying figures in which.

DETAILED DESCRIPTION

In at least some multi-engine aircraft, such as helicopters, prior art bleed systems may not be capable of supplying an adequate flowrate and/or pressure of bleed air in some operating conditions, such as when a gas turbine engine providing the bleed air is operating in a low power, or standby mode, and not being used to provide substantive motive power to the aircraft.

For the purposes of this document, the term "active" used with respect to a given engine means that the given engine is providing motive power to the aircraft. For the purposes of this document, the terms "standby" and "sub-idle" are used with respect to a given engine to mean that the given engine is operating but is providing no motive power, or at least substantially no motive power, to the aircraft, with "sub-idle" operation being a particular type of standby operation according to the present technology as described in this document. It is however understood that when operating in a "standby" mode, as used herein, the engine provides little to no motive power to the aircraft, when the standby engine is running at, below, or above, idle speed.

For the purposes of the present description, the term "conduit" with respect to a fluid is used to describe an arrangement of one or more elements, such as one or more conventional hoses, connectors, filters, pumps and the like, as may be suitable for the described functionality of the conduit, and which together form the flow path(s) to provide the functionality described with respect to the conduit. For example, a given air conduit may be defined by any number and combination of air lines, filters, control actuators, and the like, selected to provide the particular functionality described with respect to the given air conduit. As another example, a given fuel conduit may be defined by any number and combination of hoses hydraulically interconnected in parallel and/or series, by or with one or more fuel filters, switches, pumps, and the like, selected to provide the particular functionality described with respect to the given fuel conduit.

Figure 1:
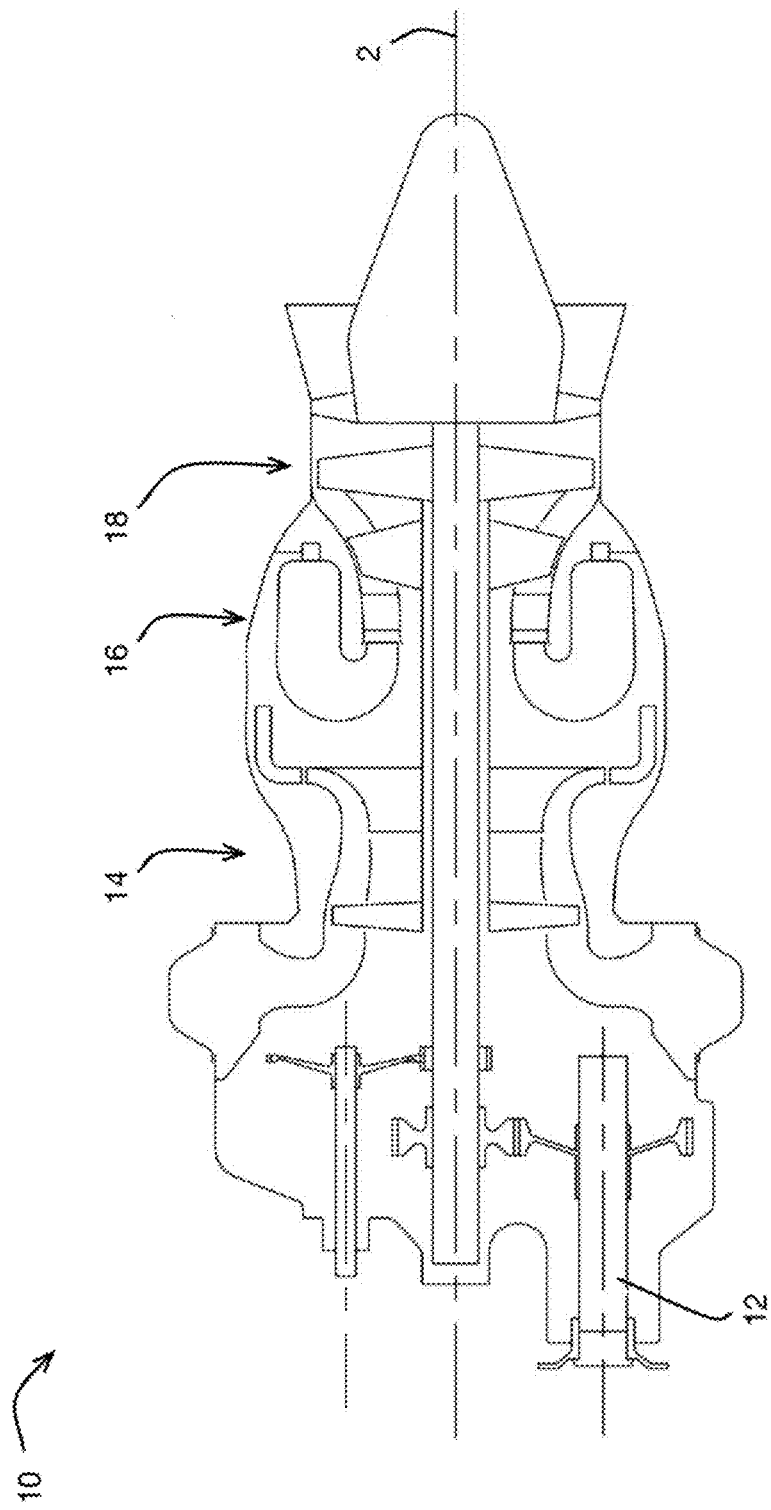
FIG. 1 is a schematic cross sectional view of a gas turbine engine.

FIG. 1 illustrates an aircraft engine 10 of a type preferably provided for use in subsonic flight, generally comprising a shaft 12 operatively connectable to a fan or other rotor, such as a helicopter rotor, and, in serial flow communication, a compressor section 14 for pressurizing ambient air, a combustor 16 in which the compressed air is mixed with fuel and ignited for generating an annular stream of hot combustion gases, and a turbine section 18 for extracting energy from the combustion gases. Components of the engine 10 are rotatable about a longitudinal center axis 2 of the engine 10. In the present embodiment, the engine 10 is a turboshaft engine. It is contemplated that the engine 10 could be a different type of engine, such as a rotary engine, a turboprop, or a turbofan engine for example.

Figure 2:
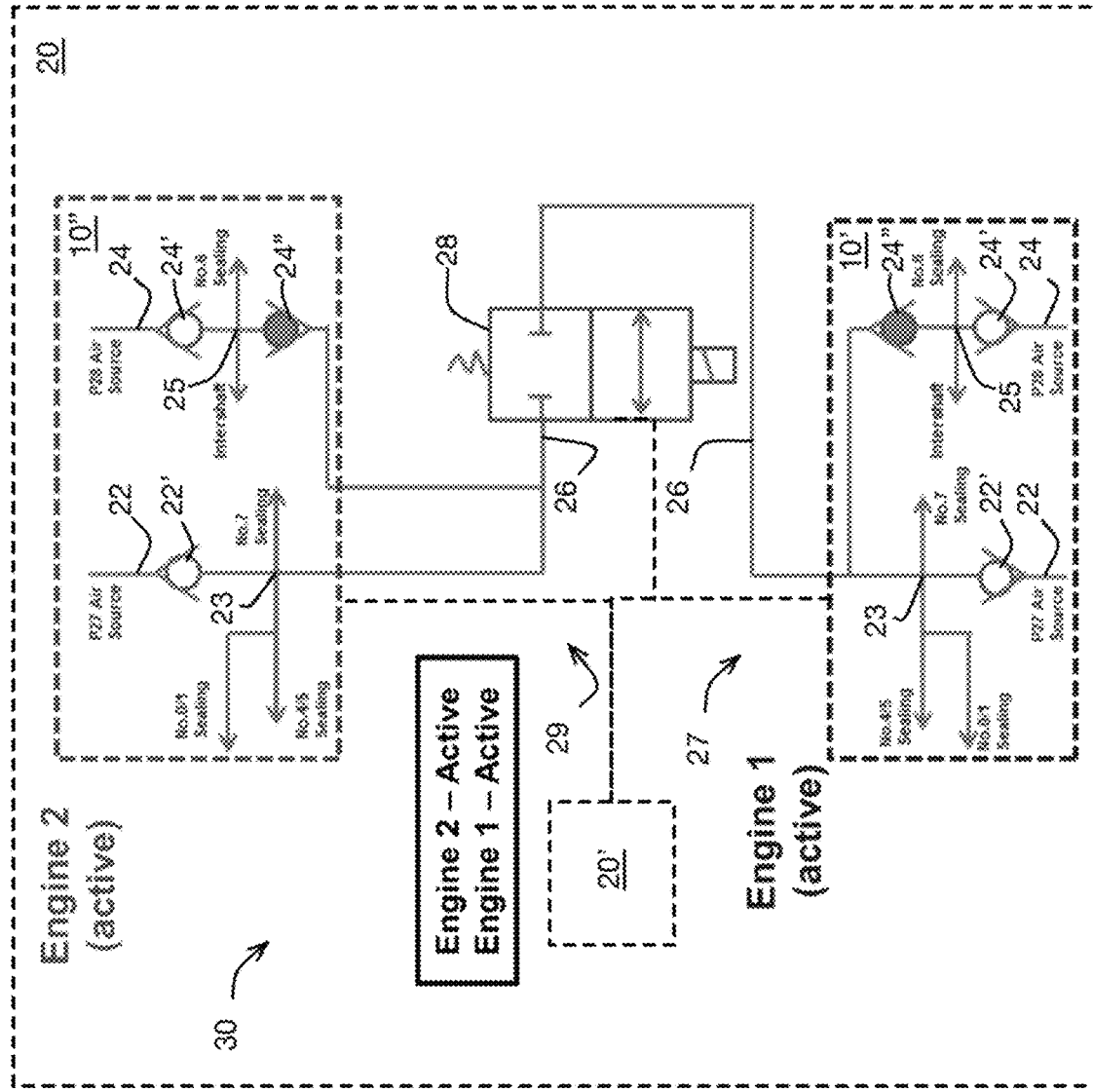
FIG. 2 is a schematic of two gas turbine engines and of an air system of an aircraft, with both of the engines being active.

FIG. 2 schematically illustrates an aircraft 20, in this example a helicopter, having a first engine 10', and a second engine 10". The engines 10', 10" are operable to provide motive power to the aircraft 20 via conventional transmission systems and controls. For simplicity, only the non-conventional aspects of the present technology are described in detail in this document. In this embodiment, each of the engines 10', 10" is substantially the same as engine 10 shown in FIG. 1 and described above. Therefore, only the first engine 10' is described in further detail. Parts of the second engine 10" that correspond to parts of the first engine 10' are labeled with the same numerals.

The illustrated exemplary multi-engine system may be used as a power plant for the aircraft 20, including but not limited to a rotorcraft such as a helicopter. The multi-engine system may include the two or more gas turbine engines 10', 10". In the case of the aircraft 20 being a helicopter, these gas turbine engines 10', 10" will be turboshaft engines. Control of the multi-engine system shown in FIG. 2 is effected by one or more controller(s) 20' (shown in FIG. 2 only, to maintain clarity of the figures), which may be FADEC(s), electronic engine controller(s) (EEC(s)), or the like, that are programmed to manage, as described herein below, the operation of the engines 10', 10". In some embodiments and operating conditions, control sequences as described in the present application may reduce an overall fuel burn of the aircraft 20, particularly during sustained cruise operating regimes, wherein the aircraft 20 is operated at a sustained (steady-state) cruising speed and altitude. The cruise operating regime is typically associated with the operation of prior art engines at equivalent part-power, such that each engine contributes approximately equally to the output power of the multi-engine system. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft 20 conditions (cruise speed and altitude) are substantially stable, the engines 10', 10" of the multi-engine system may be operated asymmetrically, with one engine operated in a high-power "active" mode and the other engine operated in a lower-power "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric operation, which may be engaged during a cruise phase of flight (continuous, steady-state flight which is typically at a given commanded constant aircraft cruising speed and altitude). The multi-engine system may be used in an aircraft, such as a helicopter, but also has applications in suitable marine and/or industrial applications or other ground operations.

Referring still to FIG. 2, according to the present description the multi-engine system driving a helicopter 20 may be operated in this asymmetric manner, in which one of the engines 10', 10" may be operated at high power in an active mode and another one of the engines 10', 10" may be operated in a low-power standby mode. In one example, the active engine may be controlled by the controller(s) 20' to run at full (or near-full) power conditions in the active mode, to supply substantially all or all of a required power and/or speed demand of the aircraft 20. The standby engine may be controlled by the controller(s) 20' to operate at low-power or no-output-power conditions to supply substantially none or none of a required power and/or speed demand of the aircraft 20. Optionally, a clutch may be provided to declutch the low-power engine. Controller(s) 20' may control the engine's governing on power according to an appropriate schedule or control regime, for example as described in this document. The controller(s) 20' may be one or multiple suitable controllers, such as for example a first controller for controlling the engine 10' and a second controller for controlling the second engine 10". The first controller and the second controller may be in communication with each other in order to implement the operations described herein. In some embodiments, and a single controller 20' may be used for controlling the first engine 10' and the second engine 10". To this end, the term controller as used herein includes any one of: a single controller controlling the engines 10', 10", and multiple controllers controlling the engines 10', 10".

In another example, an asymmetric operating regime of the engines may be achieved through the one or more controller's differential control of fuel flow to the engines, as described in pending application Ser. No. 16/535,256, the entire contents of which are incorporated herein by reference. Low fuel flow may also include zero fuel flow in some examples and/or times.

Although various differential control between the engines of the multi-engine engine system are possible and some such sequences are described in this document, in one particular embodiment the controller(s) 20' may correspondingly control fuel flow rate to each engine 10', 10" as follows. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 29 may operate one engine of the multiengine system in a standby mode at a power substantially lower than a rated cruise power level of the engine, and in some embodiments at zero output power and in other embodiments less than 10% output power relative to a reference power (provided at a reference fuel flow). Alternately still, in some embodiments, the controller(s) 20' may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system of FIG. 2 may be operated in an asymmetric operating regime by control of the relative speed of the engines using controller(s) 20', that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

In use, the one of the engines 10', 10" may operate in the active mode while the other of the engines 10', 10" may operate in the standby mode, as described above. During this asymmetric operation, if the aircraft 20 needs a power increase (expected or otherwise), the active engine(s) may be required to provide more power relative to the low power conditions of the standby mode, and possibly return immediately to a high- or full-power condition. This may occur, for example, in an emergency condition of the multi-engine system powering the helicopter, wherein the "active" engine loses power the power recovery from the lower power to the high power may take some time. Even absent an emergency, it will be desirable to repower the standby engine to exit the asymmetric mode. The controller(s) 20' may also be used to operate the various air valves described herein. To this end, any suitable operative connections and configurations of controls may be provided, so long as the functionality described herein is provided. Because such operative connections may be conventional, to maintain clarity, only one such operative connection is shown schematically in FIG. 2. The rest of the operative connections may be similar, and hence are not shown.

As shown schematically in FIG. 2, the first engine 10' includes a bleed air system 27 that includes air conduits 22, 23, 24, 25, 26 and valves 22', 24', 24", as will be seen. A first bleed air conduit 22 and a second bleed air conduit 24 are provided, both of which bleed compressed air from respective parts of the compressor section 14 of the first engine 10'. While in this application the air sources are P2.7 and P2.8, respectively, in other embodiments other locations in the compressor section 14 and/or other locations fluidly connected to the compressor section 14 may be used, for example to suit each particular embodiment and application of the engine(s) 10', 10". In the present embodiment, the first bleed air conduit 22 includes a check valve 22' and branches off into supply bleed air conduits 23 downstream of the check valve. In this embodiment, the second bleed air conduit 24 includes a check valve 24' and a check valve 24". The second bleed air conduit 24 branches off into supply bleed air conduits 25 at one or more locations that are fluidly in between the check valves 24', 24". As shown, the check valves 24', 24" are pointing toward each other, for purposes explained below.

The supply bleed air conduits 23, 25 deliver bleed air to various sealing and lubrication systems of the first engine 10' and/or to various locations for various aircraft functions. The particular airflow destinations may be selected to suit and/or may depend on the particular embodiment and application of the engine(s) 10', 10". The particular number and configuration of the sealing systems may be any suitable number and configuration, and is therefore not described in detail. The supply bleed air conduits 23 and 25 may also provide bleed air for various other functions of the first engine 10' and/or the aircraft. Examples of such functions include, but are not limited to, cooling of turbines, maintenance of cabin pressure, operation of air systems, and pressurizing liquid tanks. Any suitable air piping and controls arrangement may be used to provide for each particular combination of the functions provided for by the bleed air from the first and second bleed air conduits 22, 24.

Still referring to FIG. 2, the first and second bleed air conduits 22, 24 of the first engine 10' fluidly converge/join into a common bleed air conduit 26. The common bleed air conduit 26 fluidly connects to a control valve 28. The control valve 28 may be any suitable one or more control valves so long as it provides for the functionality described in this document. The conduits 22, 23, 24, 25, 26 and valves 22', 24', 24" of the first engine 10' are part of the bleed air system 27 of the first engine 10'. The rest of the bleed air system 27 may be conventional and is therefore not shown or described in detail herein.

As shown in FIG. 2, in the present embodiment, the bleed air system 29 of the second engine 10" is similar to the bleed air system 27 of the first engine 10', described above. Therefore, to maintain simplicity of this description, the bleed air system 29 of the second engine 10" is not described in detail. Suffice it to say that parts of the bleed air system 29 of the second engine 10" that correspond to parts of the bleed air system 27 of the first engine 10' are labeled with the same numerals.

As shown in FIG. 2, the common bleed air conduit 26 of the second engine 10", similar to the common bleed air conduit 26 of the first engine 10', fluidly connects to a control valve 28. The control valve 28 is operable by a controller of the aircraft 20 to selectively: i) fluidly connect the common bleed air conduit 26 of the first engine 10' to the common bleed air conduit 26 of the second engine 10", and ii) fluidly disconnect the common bleed air conduit 26 of the first engine 10' from the common bleed air conduit 26 of the second engine 10", as illustrated by the internal structure of the control valve 28 schematically shown in FIG. 2. The control valve 28 may be actuated using any suitable actuator of the engines 10', 10" and/or of the aircraft 20.

FIG. 2 shows a first in-flight, powered, mode of operation of the aircraft 20 during which both engines 10', 10" are "active" (a.k.a. operating in an active mode), and are therefore both providing motive power to the aircraft 20. In this operating condition, the bleed air system 27 of the first engine 10' and the bleed air system 29 of the second engine 10" are both self-sufficient. For the purposes of this document, the term "self-sufficient" used with respect to a given bleed air system of a given engine means that the given bleed air system of the given engine provides all of its intended functions for the duration of the time during which it is called upon to provide for the functions. A given bleed air system of a given engine is not "self-sufficient" when one or more of the intended functions of the given bleed air system may be unavailable or unstable due to a lack of bleed air pressure and/or bleed air supply rate provided by the corresponding engine to the given bleed air system.

Figure 3:
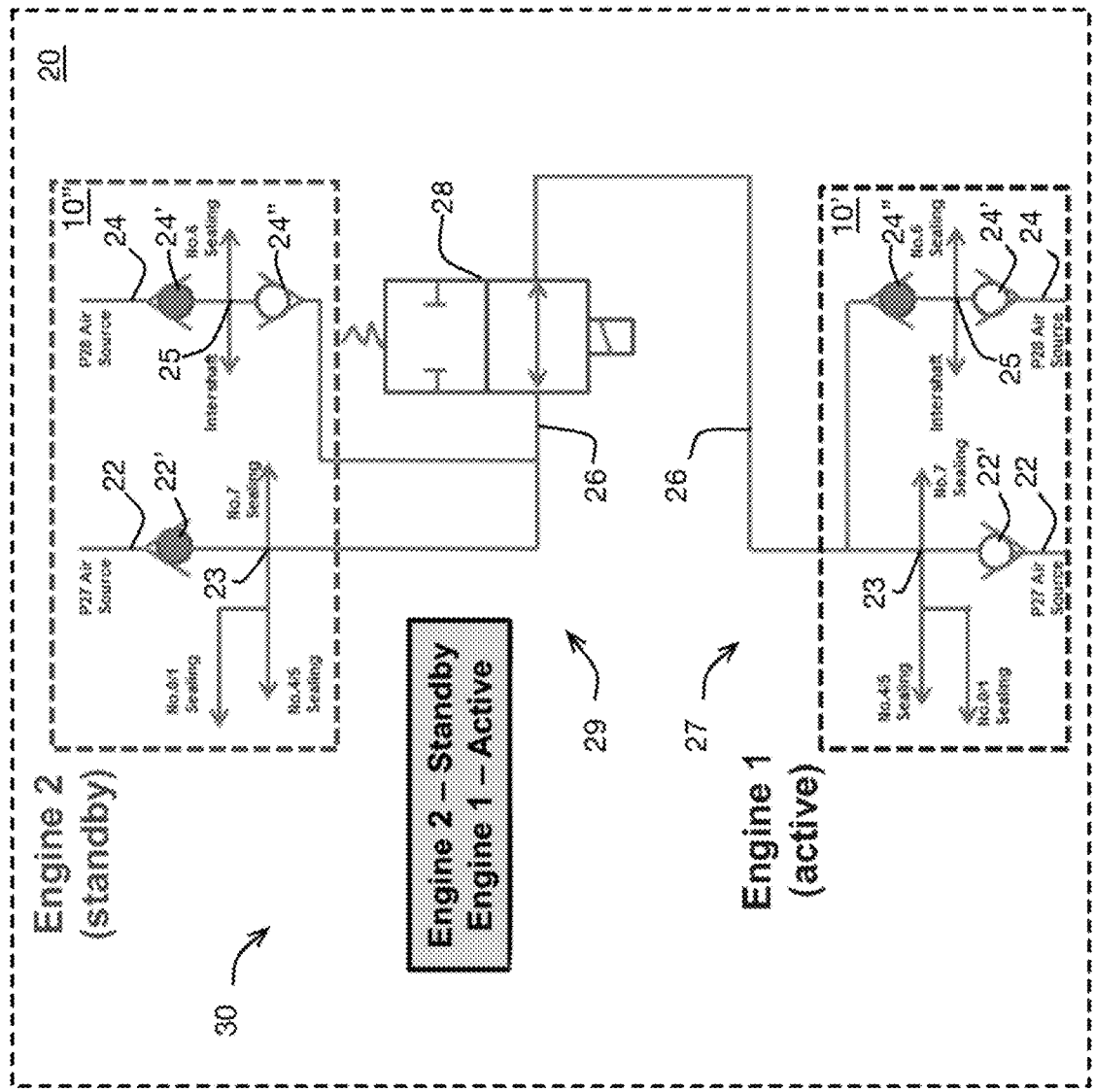
FIG. 3 is a schematic of the two gas turbine engines and of the air system of FIG. 2, with one of the engines being active and another one of the engines operating in a standby mode.

Reference is now made to FIG. 3, which shows a second in-flight, powered, mode of operation of the aircraft 20 during which: i) the first engine 10' is "active" and is therefore providing motive power to the aircraft 20, and ii) the second engine 10" is on "standby" (a.k.a. operating in a standby mode) and is therefore not providing any material amount of motive power to the aircraft 20. In this operating condition (i.e. in the second in-flight mode of operation), the bleed air system 27 of the first engine 10' is self-sufficient. On the other hand, depending on each particular embodiment of the engines 10', 10" and/or the aircraft 20 and/or on the characteristics of the particular "standby" operation of the second engine 10", the bleed air system 29 of the second engine 10" may or may not be self-sufficient in the standby mode.

For this reason, during the second in-flight mode of operation of the aircraft 20, the control valve 28 may be actuated by a suitable controller of the aircraft 20 to fluidly connect the common bleed air conduit 26 of the first engine 10' to the common bleed air conduit 26 of the second engine 10", to provide for an additional supply of bleed air from the bleed air system 27 of the first engine 10' to the bleed air system 29 of the second engine 10". Self-sufficiency of the bleed air system 29 of the second engine 10" may thereby be provided. After the second engine 10" is brought into an "active" state while the first engine 10' is in an "active" state, the control valve 28 may be actuated by a suitable controller of the aircraft 20 to fluidly disconnect the common bleed air conduit 26 of the first engine 10' from the common bleed air conduit 26 of the second engine 10", as shown in FIG. 2. After the first engine 10' is put into a standby mode or a sub-idle mode while the second engine 10" is in an "active" mode, the control valve 28 may be actuated by a suitable controller of the aircraft 20 to fluidly connect the common bleed air conduit 26 of the first engine 10' to the common bleed air conduit 26 of the second engine 10". The bleed air system 29 of the second engine 10" may thereby provide compressed air to the bleed air system 27 of the first engine 10'. Self-sufficiency of the bleed air system 27 of the first engine 10' may thereby be provided.

The bleed air systems 27, 29 of the engines 10', 10" and the control valve 28 are part of an air system 30 of the aircraft 20. As described above, the air system 30 of the aircraft 20 implemented according to the present technology may thereby provide for self-sufficient operation of at least one of the engines 10', 10" in at least some operating conditions of the aircraft 20 in which at least some prior art engine bleed air systems may not be self-sufficient.

Further, as shown in FIGS. 2 and 3 for example, in the present embodiment, the check valves 24' and 24" are provided in the bleed air conduits 24, downstream of the branching-out bleed air conduits 25. In this embodiment, this the branching-out bleed air conduits 25 may supply compressed air to at least some subsystems of the respective engines 10', 10". Each of the check valves 24' and 24" ensures that when the engine 10', 10" having that check valve 24', 24" is providing compressed air from its bleed air system 27, 29 to the bleed air system 27, 29 of the other engine 10', 10", the compressed air is provided from the air source corresponding to the bleed air conduit 22 of that engine 10', 10". The check valves 24' and 24" therefore help ensure uncompromised self-sufficient operation of the subsystems of the one of the engines 10', 10" that may at a given time be providing compressed air to the other one of the engines 10', 10". In some embodiments, the check valve 24' and/or the check valve 24" may be omitted.

The rest of the air system 30 that is not shown in the figures of the present application may be conventional and is therefore not described in detail herein. Any suitable controls and any suitable control logic may be used to provide for the functionality of the air system 30, and/or for various timings of actuation of the control valve 28 relative to switches between "active" and "standby" states that may occur with respect to each of the engines 10', 10" during in-flight or ground operations of the aircraft 20.

Figure 4:
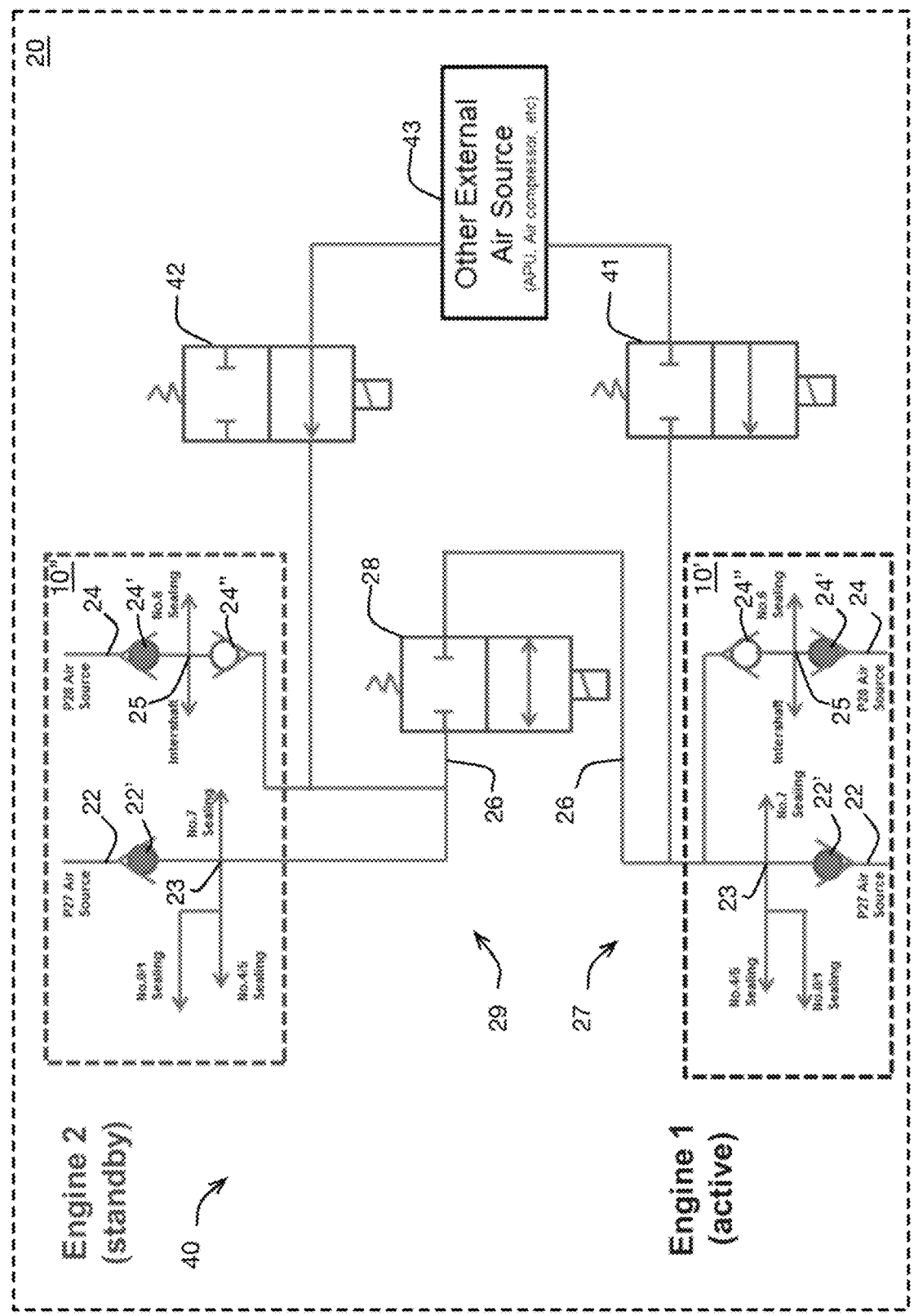
FIG. 4 is a schematic of two gas turbine engines and of the air system of the aircraft of FIG. 2, the air system being implement according to another embodiment.

Referring now to FIG. 4, an air system 40 of the aircraft 20, which is an alternative embodiment of the air system 30 is shown. The air system 40 is similar to the air system 30, and therefore similar reference numerals have been used for the air system 40. A difference of the air system 40 from the air system 30, is that air system 40 includes a control valve 41, a control valve 42, and an external compressed air source 43 such as an auxiliary power unit (APU) and/or an air compressor for example. The external compressed air source 43 may be any conventional external compressed air source suitable for each particular embodiment of the engines 10', 10" and the aircraft 20.

The control valve 41 selectively fluidly connects the external compressed air source 43 to the common bleed air conduit 26 of the first engine 10', via any suitable corresponding air conduits. More particularly, when the first engine 10' is "active", the control valve 41 may be actuated by a suitable controller of the aircraft 20 to fluidly disconnect the external compressed air source 43 from the common bleed air conduit 26 of the first engine 10', and may thereby allow the bleed air system 27 of the first engine 10' to run self-sufficiently.

When the first engine 10' is on "standby", the control valve 41 may be actuated by a suitable controller of the aircraft 20 to fluidly connect the external compressed air source 43 to the common bleed air conduit 26 of the first engine 10'. The control valve 41 may thereby provide "supplemental" compressed air to the bleed air system 27 of the first engine 10' at a supply rate and pressure sufficient to allow the bleed air system 27 of the first engine 10' to provide for all of its intended functions during the "standby" operation of the first engine 10'. The control valve 41, via corresponding air conduit(s), may selectively fluidly connect the external compressed air source 43 to a different part of the bleed air system 27 of the first engine 10', so long as the functionality described above is provided.

The control valve 42 similarly fluidly connects the external compressed air source 43 to the common bleed air conduit 26 of the second engine 10", and is actuated according to a similar control logic to allow the bleed air system 29 of the second engine 10" to provide for all of its intended functions during the "standby" operation of the second engine 10". As shown, the control valve 28 that fluidly connects the bleed air system 27 of the first engine 10' to the bleed air system 29 of the second engine 10" may be in a position in which it fluidly disconnects the first engine 10' from the second engine 10", to allow for the supplemental compressed air to be provided to either one, or to both, of the engines 10', 10" by the external compressed air source 43. In some embodiments, the control valves 28, 41, 42 may be actuated correspondingly to switch between the various possible supply modes of air described above. For example, in some operating conditions, the bleed air system 27, 29 of one of the engines 10', 10" may receive "supplemental" compressed air from one or both of: i) the bleed air system 27, 29 of another one of the engines 10', 10", and ii) the external compressed air source 43.

Figure 5:
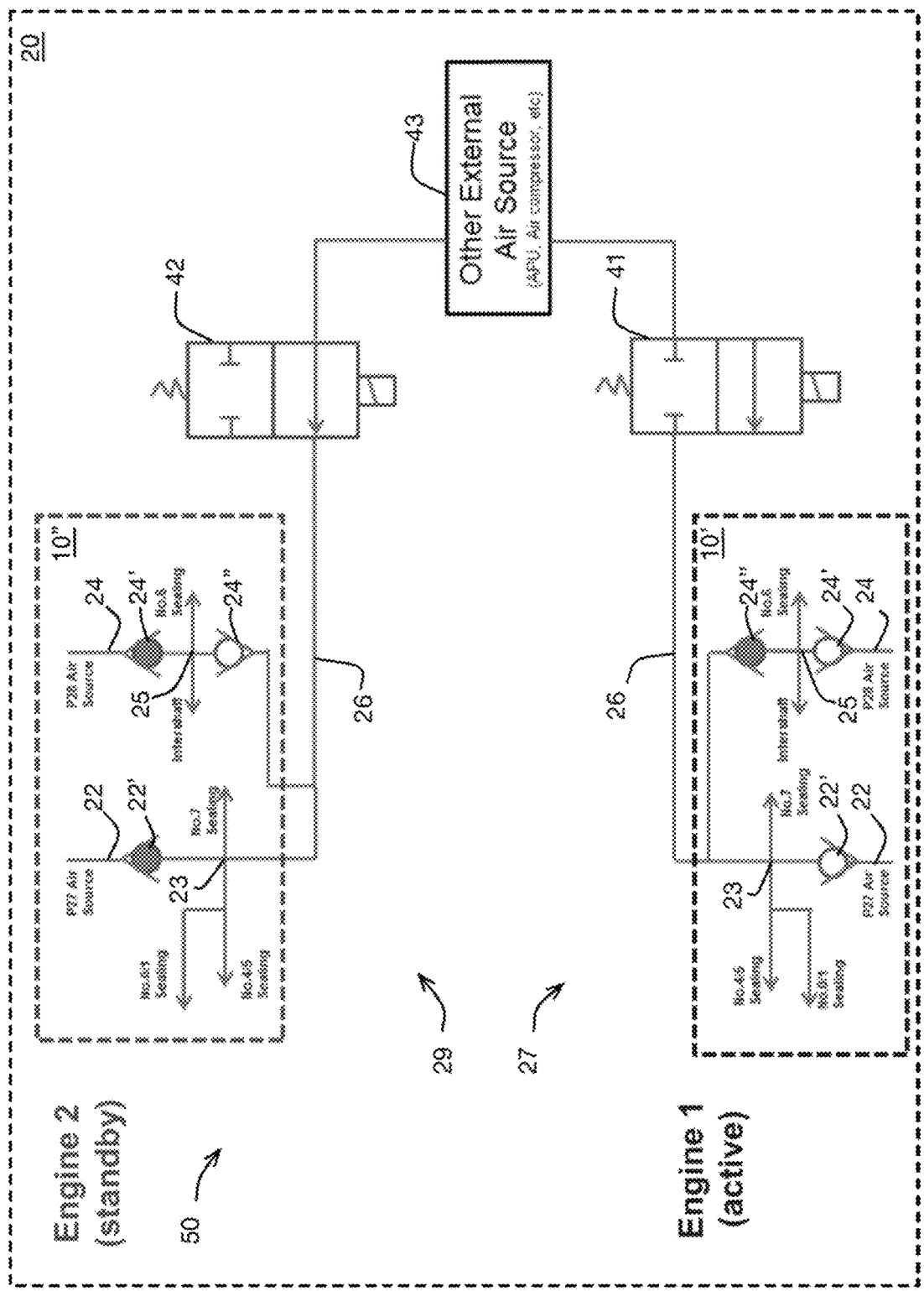
FIG. 5 is a schematic of two gas turbine engines and of the air system of the aircraft of FIG. 2, the air system being implement according to yet another embodiment.
Figure 6:
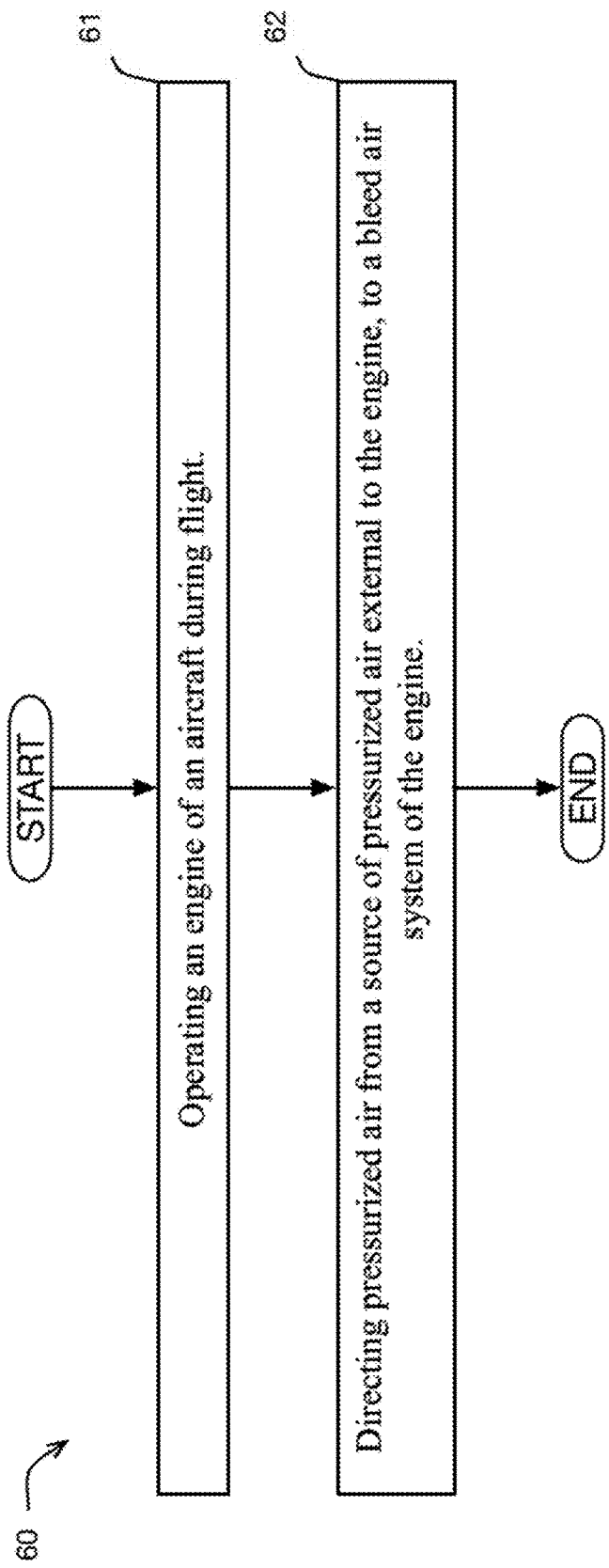
FIG. 6 is a schematic logic diagram showing a method implemented according to an embodiment of the present technology.
Figure 7:
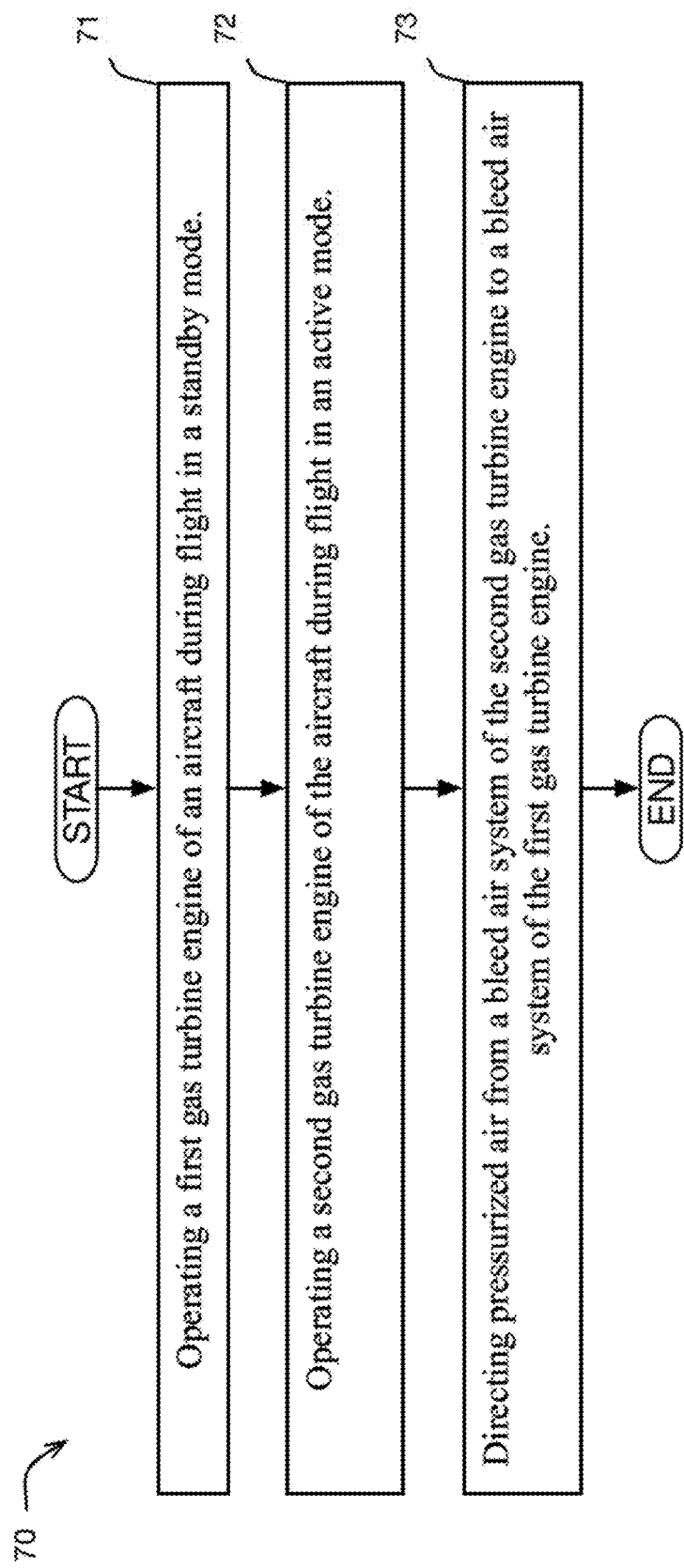
FIG. 7 is a schematic logic diagram showing a method implemented according to another embodiment of the present technology.

Referring now to FIG. 5, an air system 50 of the aircraft 20, which is yet another alternative embodiment of the air system 30 is shown. The air system 50 is similar to the air system 40, and therefore similar reference numerals have been used for the air system 50. A of the air system 50 difference from the air system 40, is that air system 50 does not have a control valve 28 for fluidly connecting the bleed air system 27 of the first engine 10' to the bleed air system 29 of the second engine 10". Operation of the air system 50 is similar to operation of the air system 40 with respect to the external compressed air source 43.

In at least some embodiments and applications, the air systems 30, 40, 50 may allow to provide "supplemental" compressed air to the bleed air system 27, 29 of one of the engines 10', 10" in at least some cases where that bleed air system 27, 29 is malfunctioning and/or leaking air for example. A person skilled in the art will appreciate that while a particular air conduit arrangement is shown in FIGS. 1 to 5, other air conduit arrangements may be used while providing for at least some of the functionality described in this document. While a single external compressed air source 43 is used in the embodiments of FIGS. 4 and 5, multiple different external compressed air sources may be used. Likewise, while the example aircraft 20 has two engines 10', 10", the present technology may be implemented with respect to more than two engines and/or with respect to other types of engines.

With the above systems in mind, the present technology provides a method 60 of using, in flight, a source of pressurized air external to an engine of an aircraft 20. As seen above, in some embodiments and operating conditions, the source of pressurized air may be one of the engines 10', 10" of the aircraft 20, and in some embodiments, an APU 43 or air compressor 43 of the aircraft 20. In some embodiments, the method 60 includes a step 61 of operating a given engine 10', 10" of the aircraft 20 during flight. In some embodiments, the method 60 also includes a step 62 of directing pressurized air from the source of pressurized air external to the given engine 10', 10", to a bleed air system 27, 29 of the given engine 10', 10".

In some embodiments, the given engine 10', 10" to which pressurized air is directed is a first engine 10' of the aircraft 20, the aircraft 20 includes a second engine 10", and the source of pressurized air external to the first engine 10' is a bleed air system 29 of the second engine 10". As seen above, in some embodiments, the aircraft 20 is a multi-engine helicopter in which the engines 10', 10" are operatively connected to drive at least one main rotor of the helicopter to provide motive power to/propel the helicopter.

As seen above, in some embodiments, the directing pressurized air to the bleed air system 27 of the first engine 10' is executed when the first engine 10' is operating in a standby mode. In embodiments in which the source of the pressurized air is the bleed air system 29 of the second engine 10", the second engine 10" is active (i.e. providing motive power to the helicopter). Similarly, in some operating conditions during flight, the given engine 10', 10" to which pressurized air is directed is a second engine 10" of the aircraft 20. In some such cases, the source of pressurized air external to the second engine 10" is a bleed air system 27 of the first engine 10'. In some such cases, the second engine 10" is in a standby mode while the first engine 10' providing the compressed air is active (i.e. providing motive power to the helicopter).

As seen above, in some embodiments, the source of pressurized air is a first source of pressurized air (e.g. first engine 10' or second engine 10", depending on which of these engines is active and which is in a standby mode), the aircraft 20 includes a second source of pressurized air (e.g. APU/air compressor 43 of the aircraft 20). In some such embodiments, the second source of pressurized air 43 is external to both the first engine 10' and the second engine 10". In some such embodiments and in some flight conditions, the method 60 comprises directing pressurized air from the second source of pressurized air 43 to the first engine 10'. In some such embodiments and in some flight conditions, the method 60 comprises directing pressurized air from the second source of pressurized air 43 to the second engine 10". Further in some such embodiments and in some flight conditions, the method 60 comprises directing pressurized air from the second source of pressurized air 43 to both the first engine 10' and the second engine 10".

Further with the structure of the aircraft 20 described above, the present technology also provides method 70 of operating a bleed air system 27 of a first gas turbine engine 10' of a multi-engine aircraft 20 during flight. In some embodiments, the method 70 comprises a step 71 of operating the first gas turbine engine 10' of the aircraft 20 during flight in a standby mode, such as an idle or a sub-idle mode that provides either no motive power or at least materially no motive power to the aircraft 20. In some embodiments, the method 70 comprises a step 71 of operating a second gas turbine engine 10" of the aircraft 20 during flight in an active mode (i.e. providing non-substantially-zero motive power to the aircraft 20).

In some cases, the steps 71 and 72 are executed simultaneously. In some such cases, the method 70 comprises directing pressurized air from a bleed air system 29 of the second gas turbine engine 10" to a bleed air system 27 of the first gas turbine engine 10'.

In some cases, the method 70 further includes a step 73 of operating a source of pressurized air (E.g. APU/air compressor 43, and the like) of the aircraft 20 external to both the first gas turbine engine 10' and the second gas turbine engine 10", and a step of directing pressurized air from the source of pressurized air 43 to at least one of the first gas turbine engine 10' and the second gas turbine engine 10".

In some cases, the directing pressurized air from one of the bleed air systems 27, 29 to the other one of the bleed air systems 27, 29 (depending on which one of the bleed air systems 27, 29 requires supplemental compressed air) may be executed simultaneously with directing pressurized air from a second source of pressurized air to the one of the bleed air systems 27, 29 that is receiving the supplemental compressed air. In some embodiments, the second source of pressurized air 43 includes, or is, at least one of: an APU 43 of the aircraft 20, and an air compressor 43 of the aircraft 20.

In some such cases, the air pressure in the one of the bleed air systems 27, 29 receiving supplemental compressed air may be lower than the pressure of the supplemental compressed air. It is contemplated that any suitable controls and control arrangements may be used to provide for this pressure differential, where required. While two engines 10', 10" of an aircraft 20 are described, it is contemplated that the present technology could be implemented with regard to a larger number of engines of an aircraft to provide supplemental compressed air from one or more of the engines or other compressed air source(s), to one or more other ones of the engines.

In at least some cases and in at least some embodiments, the technology described above may be implemented with, and may help provide or improve standby operation or sub-idle operation of one or more engines of a multi-engine aircraft, as described in the commonly owned U.S. Patent Application No. 62/855,062, entitled "CONTROL LOGIC FOR GAS TURBINE ENGINE FUEL ECONOMY", filed on May 31, 2019, and incorporated by reference herein in its entirety.

The above description is meant to be exemplary only, and one skilled in the art will recognize that changes may be made to the embodiments described without departing from the scope of the disclosed technology. For example, while the present technology is illustrated with respect to, inter alia, bleed air systems, the present technology may also be implemented with respect to other systems of a multi-engine aircraft. For example, a fuel system of one engine of an aircraft operating in an active mode may be fluidly connectable to a fuel system of another engine of the aircraft operating in a standby mode to provide supplemental pressure to the fuel system of the other engine. As another example, an oil system of one engine of an aircraft operating in an active mode may be fluidly connectable to an oil system of another engine of the aircraft operating in a standby mode to provide supplemental pressure to the oil system of the other engine. The foregoing examples are non-limiting.

The invention claimed is:

1. A method of operating an engine of an aircraft, the engine having a main gaspath extending through a compressor section, a combustor, and a turbine section, the engine having a secondary air system outside the main gaspath and including one or more of a sealing system and a lubrication system, the method comprising: when the aircraft is in flight at an altitude above ground, directing pressurized air from a source of pressurized air external to the engine to the secondary air system of the engine, the engine being operated in a standby mode in which the engine is operating, receiving a fuel flow, and providing substantially no motive power to the aircraft, wherein the directing of the pressurized air to the secondary air system includes directing the pressurized air to the secondary air system while bypassing the gaspath;
  providing at least one control valve disposed fluidly between the engine and a second engine,
  fluidly connecting the at least one control valve to a bleed outlet of the compressor section via a first conduit,
  fluidly connecting the at least one control valve to a bleed outlet of a compressor section of the second engine via a second conduit,
  each of the first and second conduits include a plurality of branch conduits disposed in between the respective bleed outlets and the at least one control valve,
  wherein the plurality of branch conduits are configured to provide the bleed air from the respective first and second conduits to one or more of the sealing system and the lubrications system.

2. The method of claim 1, wherein the engine is a first engine, the aircraft includes the second engine, and directing the pressurized air includes directing the pressurized air to the first engine from a bleed air system of the second engine.

3. The method of claim 2, wherein the source of pressurized air is a first source of pressurized air, the aircraft includes a second source of pressurized air that is external to both the first engine and the second engine, and the method further comprises directing pressurized air from the second source of pressurized air to the first engine.

4. The method of claim 3, further comprising directing pressurized air from the second source of pressurized air to the second engine.

5. The method of claim 1, wherein the source of pressurized air external to the engine is one of: an auxiliary power unit (APU) of the aircraft, and an air compressor of the aircraft.

6. The method of claim 5, wherein the engine is a first engine, the aircraft includes a second engine, and the method further includes directing pressurized air from the source of pressurized air to the second engine.

7. A method of operating a first gas turbine engine of a multi-engine aircraft, the first gas turbine engine having a main gaspath extending through a compressor section, a combustor, and a turbine section, the method comprising:
  operating the first gas turbine engine of the aircraft during flight at an altitude above a ground in a standby mode in which the first gas turbine engine is operating, receives a fuel flow, and provides substantially no motive power to the multi-engine aircraft;
  operating a second gas turbine engine of the aircraft during flight in an active mode during the flight at the altitude above the ground; and
  during the flight at the altitude above the ground, directing pressurized air from a bleed air system of the second gas turbine engine to a secondary air system of the first gas turbine engine, the secondary air system including one or more of a sealing system and a lubrication system, wherein the directing of the pressurized air to the secondary air system includes directing the pressurized air to the secondary air system while bypassing the main gaspath, including fluidly connecting a bleed outlet of the compressor section of the first gas turbine engine to at least one control valve via a first conduit and fluidly connecting the at least one control valve to a bleed outlet of a compressor section of the second gas turbine engine via a second conduit,
  wherein each of the first and second conduits include a plurality of branch conduits disposed in between the respective bleed outlets and the at least one control valve, wherein the plurality of branch conduits are configured to provide the bleed air from the respective first and second conduits to one or more of the sealing system and the lubrication system.

8. The method of claim 7, further comprising operating a source of pressurized air of the aircraft external to both the first gas turbine engine and the second gas turbine engine, and directing pressurized air from the source of pressurized air to at least one of the first gas turbine engine and the second gas turbine engine.

9. The method of claim 8, further comprising directing pressurized air from the source of pressurized air to at least another one of the first gas turbine engine and the second gas turbine engine simultaneously with the directing pressurized air from the source of pressurized air to the at least one of the first gas turbine engine and the second gas turbine engine.

10. The method of claim 7, wherein operating the first gas turbine engine of the aircraft during flight in the standby mode includes operating the first gas turbine engine at an engine speed greater than zero and less than an engine speed of the second gas turbine engine.

11. The method of claim 7, wherein directing pressurized air from the bleed air system of the second gas turbine engine to the bleed air system of the first gas turbine engine includes maintaining the first gas turbine engine in the standby mode.

12. An aircraft, comprising:
  a first engine having a bleed air system with a first common bleed air conduit, the first engine having an active mode when the aircraft is in flight at an altitude above ground;
  a second engine having a main gaspath extending through a compressor section, a combustor, and a turbine section, the second engine having a secondary air system outside the main gaspath and including one or more of a sealing system and a lubrication system, the second engine having an active mode when the aircraft is in flight at the altitude above the ground and a standby mode when the aircraft is in flight at the altitude above ground, a power output of the second engine greater in the active mode than in the standby mode, in the standby mode, the second engine is operating, receives a fuel flow, and provides substantially no motive power to the aircraft;
  at least one control valve disposed fluidly between the first engine and the second engine, the at least one control valve operable to:
    i) fluidly connect the first common bleed air conduit of the first engine to the secondary air system of the second engine when the second engine is in the standby mode and when the first engine is in the active mode; and
    ii) fluidly disconnect the first common bleed air conduit from the secondary air system of the second engine when the first engine and the second engine are in the active mode;
  a source of pressurized air that is external to the first engine and/or to the second engine, the source of pressurized air being selectively fluidly connectable to the bleed air system of the first engine and/or of the to the secondary air system of the second engine;
  a conduit fluidly connecting the at least one control valve to the compressor section of the second engine; and
  a valve fluidly connected to the conduit, the valve configured for forcing the pressurized air received from the at least one control valve to bypass the gaspath of the second engine and to flow in the secondary air system of the second engine.

13. The aircraft of claim 12, wherein the at least one control valve is disposed fluidly between the source of pressurized air and the bleed air system of the at least one of the first and the second engine, the at least one control valve being operable to selectively fluidly connect the source of pressurized air to the bleed air system of the at least one of the first and the second engine.

14. The aircraft of claim 13, wherein the at least one control valve fluidly connects: i) the bleed air system of the first engine to the bleed air system of the second engine when the second engine is operating in the standby mode while the first engine is operating in the active mode, and ii) the bleed air system of the second engine to the bleed air system of the first engine when the first engine is operating in the standby mode while the second engine is operating in the active mode.

15. The aircraft of claim 12, wherein of the source of pressurized air is: a) the bleed air system of the second engine when the first engine is operating in the standby mode, b) the bleed air system of the first engine when the second engine is operating in the standby mode.

16. The aircraft of claim 12, further comprising a second source of pressurized air that is external to both the first and the second engine, the second source of pressurized air being selectively fluidly connectable simultaneously to both first and the second engine.

17. The aircraft of claim 16, wherein the second source of pressurized air is an auxiliary power unit of the aircraft.

18. An aircraft, comprising:
- a first engine having a bleed air system with a first common bleed air conduit, the first engine having an active mode when the aircraft is in flight at an altitude above ground;
- a second engine having a bleed air system with a second common bleed air conduit, the second engine having an active mode when the aircraft is in flight at the altitude above the ground and a standby mode when the aircraft is in flight at the altitude above ground, a power output of the second engine greater in the active mode than in the standby mode, in the standby mode, the second engine is operating, receives a fuel flow, and provides substantially no motive power to the aircraft;
- at least one control valve disposed fluidly between the first and second common bleed air conduits, the at least one control valve operable to:
  i) fluidly connect the first common bleed air conduit to the second common bleed air conduit when the second engine is in the standby mode and when the first engine is in the active mode; and
  ii) fluidly disconnect the first common bleed air conduit from the second common bleed air conduit when the first engine and the second engine are in the active mode; and
- a source of pressurized air that is external to the first engine and/or to the second engine, the source of pressurized air being selectively fluidly connectable to the bleed air system of the first engine and/or of the second engine;
- wherein each of the first engine and the second engine comprises:
- a first bleed air conduit, a second bleed air conduit;
- each of the first and second common bleed air conduits fluidly connected to both of the first and second bleed air conduits of their respective engine; and
- a check valve disposed fluidly between the second bleed air conduit and the first or second common bleed air conduit of a respective engine, and operable to prevent air flowing from the second bleed air conduit to the first or second common bleed air conduit.

* * * * *